United States Patent
Cope et al.

(10) Patent No.: US 6,751,580 B1
(45) Date of Patent: Jun. 15, 2004

(54) TORNADO RECOGNITION SYSTEM AND ASSOCIATED METHODS

(75) Inventors: R. Bradley Cope, Oviedo, FL (US); Jack W. Baumgardner, Oviedo, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/567,559

(22) Filed: May 5, 2000

(51) Int. Cl.[7] .................. G06F 17/10; G06F 7/60; G01W 1/00
(52) U.S. Cl. ............................ 703/2; 340/601
(58) Field of Search .................. 703/2; 340/601; 706/22

(56) References Cited

U.S. PATENT DOCUMENTS 6,097,296 A * 8/2000 Garza et al. ............... 340/601
6,529,866 B1 3/2003 Cope

OTHER PUBLICATIONS

Amlan Kunda, George C. Chen, "An Integrated Neural Network and Hidden Markov Model Classifier for Sonar Signal Classification", 1995, IEEE, pp. 3587–3590.*

M. Alexiuk, N. Pizzi and W. Pedrycz, "Classification of Volumetric Storm Cell Patterns" IEEE 1999, pp. 1081–1085.*

Nicolino J. Pizzi, "Classification of storm events using fuzzy encoded multiplayer perception", National Research Council Canada, 2000, pp. 547–550.*

Paula Gaunard, Corine Ginette Mubikangiey, Chritophe Couvreur and Vincent Fontain, "Automatic Classification of Environmental Noise Events By Hidden Markov Models" IEEE 1998, pp. 3609–3612.*

Chengalwarayan, Rathinavelu "Hierarchical Subband Linear Predictive Cepstral (HSLPC) Features for HMM–Based Speech Recognition", IEEE 1999, pp. 409–412.*

PhD thesis of M.K. Ravishankar(Carnegie Mellon University 1996).

S. Young, The HTK Book, Entropic Research Laboratory, Cambridge University Technical Services, Inc. 1997.

A.J. Viterbi, "Error Bounds for Convolution Codes and Asymptotically Optimum Decoding Algorithm, "IEEE Transactions Information Theory IT–13, Apr. 1967.

C.E. Shannon, "A Mathematical Theory of Communication" The Bell System Technical Journal, vol. 27, pp. 379–423, 623–656, Jul., Oct. 1948.

S.G. Boemler and r. Bradley Cope, Improved Speech Recognition using Quantized Frequency Domain Filters.

* cited by examiner

*Primary Examiner*—Hugh Jones
*Assistant Examiner*—Dwin M. Craig
(74) *Attorney, Agent, or Firm*—Eliot Abolafia

(57) ABSTRACT

A tornado recognition system converts a sound signal containing a weather-indicating component and a noise component into a probability of a presence of a tornado. The sound signal is transformed from a time domain into a frequency domain and compared with a set of previously developed Markov models of possible signals representative of a presence of the tornado. Next a determination is made by using Virterbi beam search of the probable presence of the tornado. The probability is used to inform of the presence of a tornado.

7 Claims, 3 Drawing Sheets

TORNADO RECOGNITION SYSTEM AND ASSOCIATED METHODS

BACKGROUND OF THE INVENTION

1. Field of the Invention

The present invention relates to weather tracking systems and, more particularly, to such systems employing an acoustic signature matching device for tracking rapidly moving extreme weather systems such as tornadoes.

2. Description of Related Art

The recognition of acoustic signatures is a subset of the general problem of signal processing. Concomitant with developments in CPU power and memory size, software-based signal processing models have been created. A continuing difficulty, however, has been the creation of such models that can operate in or close to real time and preserve recognition accuracy.

As is well known in the art, one of the tools of signal recognition technology comprises the "hidden Markov model" (HMM). The HMM is a probabilistic pattern-matching approach which models a time-sequence of speech patterns as the result of random processes. The model is said to be 'hidden' because the initial state sequence that yields a given sequence of patterns cannot be determined. For example it is well known in the art that, the HMM is used in Carnegie Mellon's Sphinx-II system, a statistical modeling package for speech recognition.

In addition to recognizing a sequence of sounds as comprising a particular signature, which can be approached as a statistical problem, an interpretation of that sequence must also be made. This interpretation is known as decoding. This interpretation comprises searching for the most likely sequence of sounds given the input signal. One of the well-known methods known in the art is Viterbi decoding using a beam search, which is a dynamic programming algorithm that searches the state space for the most likely state sequence that accounts for the input signal. The state space is constructed by creating HMM models from the constituent HMM models, and the beam search is applied to limit the resulting large state space by eliminating less likely states. The Viterbi method is a time-synchronous search that processes the input signal one frame at a time and at a particular rate, typically 100 frames/sec.

The motion and formation of tornadoes have been difficult to predict, since they are highly localized, form quickly, and move erratically and very quickly. Although acoustic monitoring is widely utilized in weather tracking, there is need to improve the range, accuracy and processing time for determining the presence, location and movement of severe weather systems such as tornadoes.

SUMMARY OF THE INVENTION

It is therefore an object of the present invention to provide an improved signal recognition system for recognizing an approach or presence of an extreme weather system from an audio signal.

It is a further object to provide such a method for recognizing a tornado.

It is another object to provide such a method of building a set of software-based models for use in tornado recognition.

An additional object is to provide a system and method for generating a frequency-domain software system for use in signal processing applications.

A further object is to provide a system for providing early warning of a dangerous weather system such as a tornado.

These objects and others are attained by the present invention, an improved tornado recognition system and associated methods. A particular problem to be addressed herein is that people often ignore tornado warnings because sensors for tornadic activity are regional and are not deterministic. One aspect of the invention is a method and system for converting a sound signal containing a weather-indicating component and a noise component into a probability of a presence of an extreme weather system. The method comprises the steps of transforming the sound signal from a time domain into a frequency domain. Next the transformed signal is compared with a set of models of sound signals representative of a presence of the extreme weather system.

Next a determination is made from the comparing step of the probability of the presence of the extreme weather system. Finally, the determined probability is output, which enables a user to take an appropriate action.

In a particular embodiment of the invention for locating and tracking a tornado, a plurality of sound signals are collected in spaced-apart relation from each other to enable a triangulation of the signals if a tornadic acoustic signature is detected to a predetermined probability.

Another aspect of the invention is a method for determining a probability of a presence of an extreme weather system by collecting a sound signal that includes a tornado-indicating component and a noise component from an outdoor location. The sound signal is transformed from a time domain into a frequency domain. Next a training signal that comprises a weather-indicating component is transformed from a time domain to a frequency domain. Mel-banding is applied to the training signal. The mel-banded training signal is multiplied by a series of harmonically related cosine functions to obtain mel frequency cepstral coefficients. Hidden Markov models are built from the coefficients. Next the transformed sound signal is compared with at least one hidden Markov model representative of a presence of the extreme weather system. The probability for the presence of the extreme weather is determined. Finally the probability of an existence of a tornado is output to a location remote from the outdoor location.

In yet another aspect of the present invention the sound signal is collected from at least three outdoor locations in spaced relation from each other. The signal is transformed from a time domain into a frequency domain. A training signal comprising a weather-indicating component is transformed from a time domain to a frequency domain. Mel banding is performed on the training signal. The mel-banded training signal is multiplied by a series of harmonically related cosine functions to obtain mel frequency cepstral coefficients. Hidden Markov models are built from the coefficients. The transformed sound signal is compared with at least one hidden Markov model representative of a presence of the extreme weather system. A probability for the presence of the extreme weather is determined. Finally, the probability representative of a determination is output.

In yet a further aspect the method of building a set of models for determining a presence of a tornado from an outdoor weather sound signal comprises transforming a plurality of training sound signals from a time domain to a frequency domain, performing mel banding to the training signal, multiplying the mel-banded training signal by a series of harmonically related cosine functions to obtain mel frequency cepstral coefficients; and building hidden Markov models from the coefficients wherein building hidden Markov models comprises building five-state models.

In yet another embodiment of the present invention for converting a sound signal containing a weather-indicating component and noise into a probability of a presence of an extreme weather condition comprises a means for collecting the sound signal. The collecting means is positioned in an outdoor location wherein the collecting means comprises plurality of collecting means positioned in spaced relation from each other. A means for transforming the sound signal from a time domain into a frequency domain is provided. A means for transmitting the sound signal from the collecting means to the transforming means is also included. The embodiment includes a means for comparing the transformed sound signal with a set of models of all possible sound signals of the extreme weather condition. The comparing means receives the transformed sound signal from the transforming means and outputs a comparing signal. Next, a means for making a determination of a probability of a presence of the extreme weather condition by searching a set of control data models to match at least one data model with the transformed sound signal is included. The probability determination means receives the comparing signal and generates a probability signal. Finally, a means for outputting the probability signal is provided wherein the probability outputting means comprises a modem in electronic communication with a network.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

Figure 1:
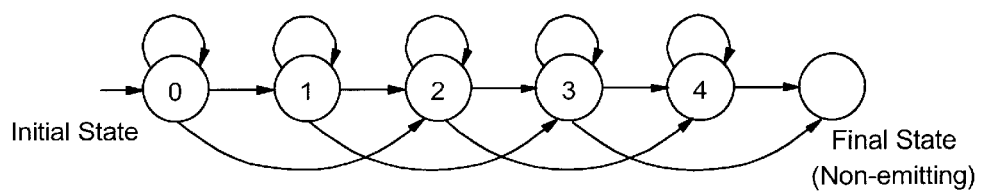
FIG. 1 (prior art) is a schematic diagram of a 5-state HMM topology model.
Figure 2:
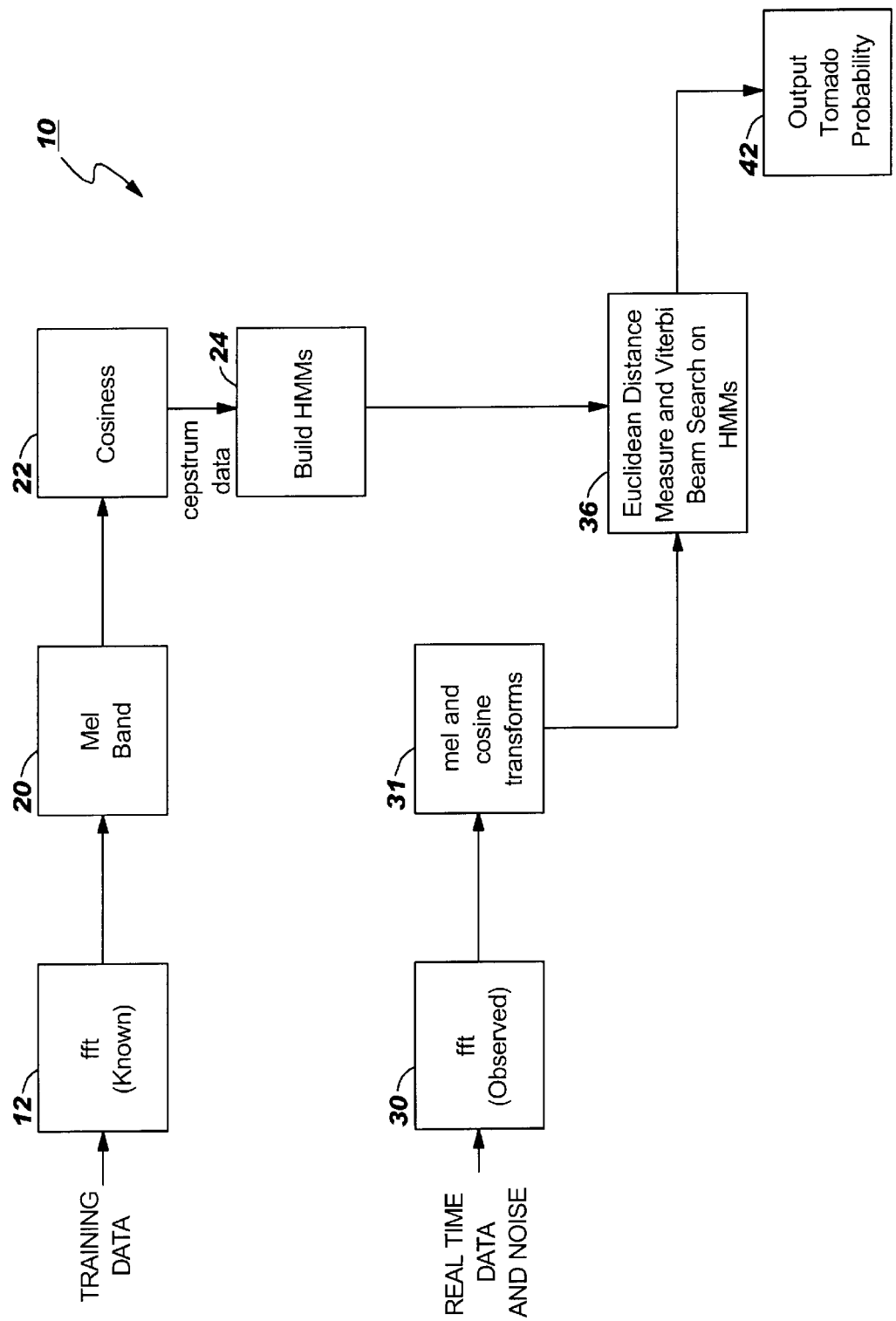
FIG. 2 is a schematic diagram of the tornado warning method of the present invention.
Figure 3:
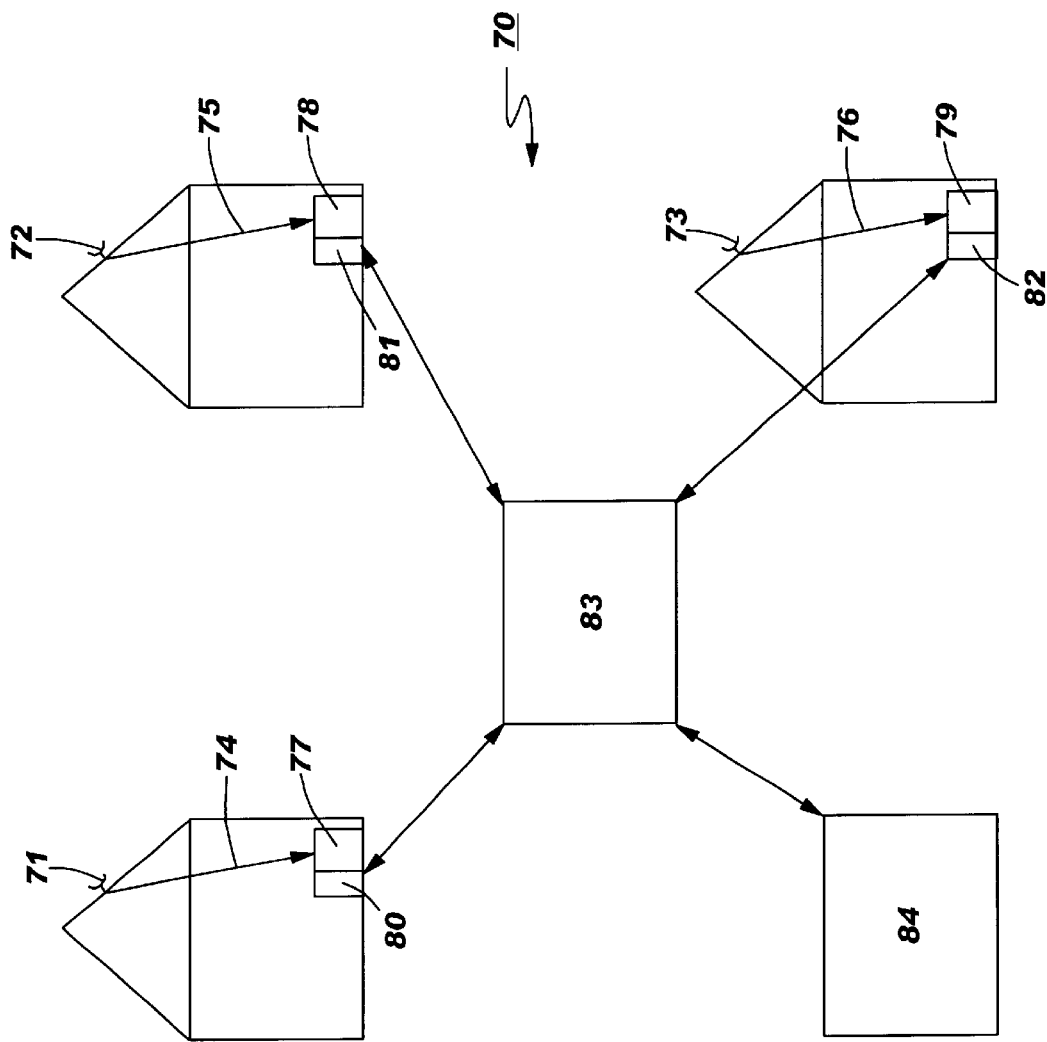
FIG. 3 is a schematic diagram of the tornado warning system and network.

A description of the preferred embodiments of the present invention will now be presented with reference to FIGS. 1–3.

Theoretical Basis

The theoretical basis of the invention comprises the fact that state transitions of observed spectral content can be modeled with state transition Markov modeling. The models are trained with observational data representing characteristics of behavior. The observations are manifested in the form of feature vectors from the vector classification process. During pattern recognition, Markov models are evaluated for their likelihood of occurrence, which can be used to indicate recognized behavior. The feature vector classification provides the observational data to a Markov model recognition process whereby the feature vector classification processes the raw input sequence to determine the most probable spectral content, and the HMM aligns the output classification based on the temporal structure of the observations. The classification process and Markov models have been used to recognize human behavior, namely, speech recognition. The process can be optimized to operate in real time and can be used to model a repeatable sequence of observations, such as tornadic behavior.

A critical hypothesis of the present invention is that the frequency spectrum of an outdoor weather signal contains frequency components that are indicative of a tornado, thus enabling recognition thereof with a "tornadic acoustic signature." With a reduction of the content of the frequency spectrum, a system results that necessarily demonstrates an improved signal-to-noise ratio.

This hypothesis is grounded in the mathematical approximations that are applied when the continuous transformation theory developed by Fourier is adapted for use in a digital signal processing (DSP) application. Fourier transformation is based on a time-varying signal being composed of an infinite number of sine waves. The DSP assumption is that continuous time t can be separated into discrete quantities by sampling every T seconds. The quantification of time permits integrals to be approximated as summations over an infinite number n of samples, and the continuous time domain signal x(t) is replaced by the discrete x(nT).

Digital Fourier transformation (DFT) analyzes the frequency domain f into an infinite summation of harmonic complex sinusoids exp(–j.omega. nT) with amplitudes proportional to x(nT). The spectrum X(.omega.) of these sinusoids is a periodic function of the continuous radial frequency .omega.=2.pi.f:

X(.omega.)=.SIGMA.x(nT)exp(–j.omega.nt)

Noise Filtering

The noise filtering method comprises a filter to eliminate local wind noise by reprocessing the output data from a Fast Fourier Transformation (FFT) software routine. These data are then ordered in a frequency series of coefficients X(k), which are in a numerical format (generally floating point, although this is not intended as a limitation). These data are reordered in descending value (amplitude) so that the relatively lowest predetermined number, for example only and not by way of limitation, 200, amplitudes can be identified and a lowest-amplitude threshold established. The data are then reassembled in the original DFT output form, except that the identified "noise" amplitudes below the threshold are set to zero.

The filtered frequency domain may be thought of as a bar graph comprising for example only and not by way of limitation, 256 frequency bins on the horizontal axis, only 56 of which have any height. A correlated filter is also generated and stored such that for these 56 quantized frequencies the amplitude is set to one (unity gain), and all other frequencies have near zero gain. This filter is referred to as a quantized frequency domain filter or briefly as a comb filter. A multiplication of this filter by the input is equivalent to a threshold sort and reorder process.

The digital signal processing is repeated with a predetermined frequency for example only and not by way of limitation 10 msec.

A particular embodiment comprises a software routine and method that performs the threshold sort/reordering steps. This routine is insertable into existing software that is adapted to calculate a fast Fourier transform, such as that in the Sphinx-II system. Using acoustic data from tornadic activity, statistically based Markov models are developed to recognize tornadoes from observational data. The development of this observational data is called training the model, and the data is called training data. The observational data is preferably obtained from all possible directions and preferably has little ambient noise from local winds. Microphones are preferably used to capture data from all directions in a horizontal plane. Such microphones may comprise a single microphone or an array thereof mixed into a single signal. A preferred microphone has sufficient sensitivity to capture the tornadic acoustic activity at a predetermined distance without being overpowered by local wind noise.

A preferred embodiment of the present invention comprises, a system that includes a software routine, and method that locates and tracks a tornado. Variability of wind noise is inherent in the hidden Markov model. The training model is built from a representative set of acoustic weather data. The exemplary base system, Sphinx-II, comprises a hidden Markov model (HMM).

The variability of wind noise is inherent in the hidden Markov model. The model is built from a representative set of acoustic weather data. Referring to FIG. 2, the acoustic signature recognition begins by sampling an analog microphone input (not shown) for obtaining real time data and noise with an analog-to-digital (A/D) converter. In one particular embodiment the sampling rate is 16 kHz, which is more than twice the highest signal frequency, commonly known as the Nyquist frequency, in the art of speech recognition, and which prevents aliasing of the sampled signal. The digital audio is then transformed from the time domain to the frequency domain by way of an FFT 30, one of a class of computationally efficient algorithms that implement the DFT. The transforms are performed on a repeated period, for example and not by way of limitation every 10 msec on the input, and the resulting frequency spectrum is partitioned using a set of Hamming windows. Biologically inspired mel scale frequency overlapping bandpass filtering 31 is applied to the spectral data, producing more resolution at the lower frequencies. Subsequently, the mel spectrum is multiplied by a series of harmonically related cosine functions 31 as is well-known in the art, with the output used to characterize the cepstral energy, thus obtaining the mel frequency cepstral coefficients (MFCCs).

Hidden Markov models are developed from training data. Training data is processed by the re-estimation of each possible state to establish a distribution of the MFCC classifications that could occur for each 10-msec period. A feed-forward state transition topology 12 is applied to the training data to model the transitions between each 10-msec audio sample window. Mel-banding 20 and cosine transformations 22 then process the known FFT models to build the HMMs 24. Viterbi, or Baum-Welch re-estimation, algorithms, then compute the statistical likelihood of the model producing a given input or sequence of acoustic articulation observations 24 thereby completing the stored model.

Within the stored model state machine HMMs are partitioned. Each 10-msec state of the acoustic articulation model has a probability distribution for the feature vectors that can occur for that moment in time. Initially, the probability distribution is established by aligning the acoustic signal with a prescribed topology for the expected signal.

Subsequently, the probability distribution is set by re-estimating a large set of feature vectors specific to the acoustic signature from a variety of tornadoes. The prescribed acoustic articulation topology is defined in a dictionary of tornadic acoustic articulations. This dictionary can include many variations of a signature, which means there will be a unique set for each possible variation.

Filtering Using Holistic System

The method and system disclosed herein comprises a component for converting a sound signal consisting of real time data containing a possible tornadic component and a noise component into a recognizable observance, wherein the sound signal is transformed from a time domain into a frequency domain. A filter is then applied to the transformed real time signal. Next, the filtered, transformed signal is compared with a set of trained models of possible sound signals representative of tornadic activity to find a closest-matching known sound signal. Next a determination is made of an identity of the weather system by searching a set of control data models, using Euclidean distance measure and Viterbi Beam Search on the HMMs to match a data model with the filtered transformed signal. Finally, a text stream representative of the determination is output, which enables a tornadic warning system to identify whether or not the sound is tornadic. A complete description of one such method and system that may be adapted is described in U.S. Pat. No. 6,529,866 by present inventor, R. Bradley Cope et al, entitled Speech recognition system and associated methods, incorporated herein by reference.

Tornado Recognition System

The system 10 of what is at present believed to be the best mode of the invention is illustrated schematically in FIGS. 2 and 3. In a first aspect of the invention, the training data are transformed from the time domain into the frequency domain using a method known in the art, the fast Fourier transform (FFT) 12. Mel banding is performed 20 on the transformed data, and the mel spectrum is multiplied by a series of harmonically related cosine functions 22, which are then used to characterize the cepstral energy. This yields the mel frequency cepstral coefficients (MFCCs). Hidden Markov models (HMMs) are developed 24 by re-estimating each possible state and establishing a distribution of the MFCC classifications that could occur for each 10-msec period. For developing the HMMs the filtered data is used which has had the component of the wind noise removed that is local to the microphone or other receptive device. This wind noise is related to the mechanics of the system and is not directly indicative of the presence or absence of a tornado. It can be filtered from the data because it is out of band from the tornadic noise.

Subsequently, recognition is performed using the Euclidean distance measure and Viterbi beam search 36. As described hereinabove, the discrete frequencies resulting from the FFT emissions of the tornado are stochastic processes that can be described with discrete Markoff processes. As is well known in the art, the probability of occurrence of a set of discrete frequencies indicative of a particular signal carrying information content is limited to a finite number of possible states. However, the number of states is sufficiently large so that screening is necessary in order to identify the particular discrete state, which indicates the presence of a tornado, this being the information content of interest. To provide effective comparison of the real-time data and noise with the stored HMM's a search algorithm is required. As is well known in the art, Viterbi beam search comprises an algorithm, which computes the most likely state sequence emitting the observation. The Viterbi algorithm searches the HMMs in parallel and compares all possible state sequences that could have produced the observed tornadic acoustic sequence and then processes the sequence having the highest probability with the resulting decoding of the real time data sequence, thereby resulting in a high probability identification of a tornado. In this method, the recognition system uses the stored acoustic data built with the training data. Next a probability of the acoustic signal's representing a tornado is calculated, and the probability is output 42.

In order to perform localized tracking and identification, the hardware system 70 illustrated in FIG. 3 is implemented. In this system 70 at least three microphones 71,72,73 are positioned on, for example, rooftops of nearby dwellings, although such a positioning is not intended as a limitation. The microphones preferably are designed to be local wind noise resistant and omnidirectional, or be operated such as by rotation to accomplish omnidirectional coverage. Data collected from the microphones 71–73 are relayed via lines 74–76 to processors, for example, personal computers 77–79 located in the dwellings. The computers 77–79 are linked via modem 80–82, or other suitable technique, to a network, such as the internet 83. Each computer could have resident thereon the software system 10 as described above to relay the output probability to a computational site 84; alternatively, the unprocessed data could be relayed over the network to the computational site 84, which would have resident therein the software system 10. In either case, the computation site 84 would further comprise software computational means for performing triangulation on the data by well-known techniques to localize and track the tornado activity.

Preferably the computational site 84 further comprises means for outputting tornadic activity information to a publicly accessible site, such as a website, so that early and accurate warning could be obtained by dwellers within the region served by the computational site 84.

It may be appreciated by one skilled in the art that additional embodiments may be contemplated, including the adaptation of the invention using alternate matching techniques.

In the foregoing description, certain, terms have been used for brevity, clarity, and understanding, but no unnecessary limitations are to be implied, therefrom beyond the requirements of the prior art, because such: words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

What is claimed is:

1. A method for determining a probability of a presence of an extreme weather system comprising:
    transforming a sound signal containing a weather-indicating component and a noise component from a time domain into a frequency domain;
    transforming a training signal comprising a weather-indicating component from a time domain to a frequency domain;
    performing mel banding to the training signal;
    multiplying the mel-banded training signal by a series of harmonically related cosine functions to obtain mel frequency cepstral coefficients;
    building five-state hidden Markov models from the coefficients;
    comparing the transformed signal with a set of models of possible sound signals representative of a presence of an extreme weather system;
    making a determination from the comparing step of a probability of the presence of the extreme weather system; and
    outputting the probability representative of the determination.

2. A method for determining a probability of a presence of an extreme weather system comprising:
    collecting a sound signal from an outdoor location, the sound signal having a weather-indicating component that consists of an acoustic signature for a tornado and a noise component;
    transforming the sound signal from a time domain into a frequency domain;
    transforming a training signal comprising a weather-indicating component from a time domain to a frequency domain;
    performing mel-banding to the training signal;
    multiplying the mel-banded training signal by a series of harmonically related cosine functions to obtain mel frequency cepstral coefficients;
    building hidden Markov models from the coefficients;
    comparing the transformed sound signal with at least one hidden Markov model representative of a presence of the extreme weather system;
    determining a probability for the presence of the extreme weather; and
    outputting the probability of an existence of a tornado to a location remote from the outdoor location.

3. A method for determining a probability of a presence of an extreme weather system comprising:
    collecting a sound signal from at least three outdoor locations in spaced relation from each other, at least one of the sound signals having a weather-indicating component that consists of an acoustic signature for a tornado and a noise component;
    transforming the sound signal from a time domain into a frequency domain;
    transforming a training signal comprising a weather-indicating component from a time domain to a frequency domain;
    performing mel-banding to the training signal;
    multiplying the mel-banded training signal by a series of harmonically related cosine functions to obtain mel frequency cepstral coefficients;
    building hidden Markov models from the coefficients;
    comparing the transformed sound signal with at least one hidden Markov model representative of a presence of the extreme weather system;
    determining a probability for the presence of the extreme weather; and
    outputting the probability representative of a determination.

4. The method recited in claim 3, wherein probability-outputting comprises:
    outputting the probability of an existence of the tornado to a computation site remote from the outdoor location; and
    correlating the probabilities from the outdoor locations to determine a possible location of the tornado.

5. A system for converting a sound signal containing a weather-indicating component and noise into a probability of a presence of an extreme weather condition comprising:

means for collecting the sound signal, the collecting means positioned in an outdoor location wherein the collecting means comprises a plurality of collecting means positioned in spaced relation from each other;

means for transforming the sound signal from a time domain into a frequency domain;

means for transmitting the sound signal from the collecting means to the transforming means;

means for comparing the transformed sound signal with a set of models of all possible sound signals of the extreme weather condition, the comparing means receiving the transformed sound signal from the transforming means and outputting a comparing signal;

means for making a determination of a probability of a presence of the extreme weather condition by searching a set of control data models to match at least one data model with the transformed sound signal, the probability determination means receiving the comparing signal and generating a probability signal; and means for outputting the probability signal wherein the probability outputting means comprises a modem in electronic communication with a network.

6. The system recited in claim 5, further comprising a computation site in electronic communication with the network, the computation site having a means for correlating the output probabilities from the outdoor locations to determine a possible location of a tornado.

7. A method of building a set of models for determining a presence of a tornado from an outdoor weather sound signal comprising:

transforming a plurality of training sound signals from a time domain to a frequency domain;

performing mel banding to the training signal;

multiplying the mel-banded training signal by a series of harmonically related cosine functions to obtain mel frequency cepstral coefficients; and building hidden Markov models from the coefficients wherein building hidden Markov models comprises building five-state models.

\* \* \* \* \*